(12) United States Patent
Hasegawa

(10) Patent No.: US 6,632,992 B2
(45) Date of Patent: Oct. 14, 2003

(54) SYSTEM AND METHOD FOR DISTRIBUTING MUSIC DATA WITH ADVERTISEMENT

(75) Inventor: Yutaka Hasegawa, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/907,386

(22) Filed: Jul. 17, 2001

(65) Prior Publication Data
US 2002/0007719 A1 Jan. 24, 2002

(30) Foreign Application Priority Data
Jul. 19, 2000 (JP) ........................ 2000-219109

(51) Int. Cl.[7] .................. A63H 5/00; G04B 13/00; G10H 7/00
(52) U.S. Cl. .................... 84/609; 434/307 A; 705/14
(58) Field of Search .................. 84/609–614, 634–638, 84/477 R, 478, DIG. 6; 434/307 A; 705/14, 26, 27

(56) References Cited

U.S. PATENT DOCUMENTS

| | | | | |
|---|---|---|---|---|
| 5,890,910 A | * | 4/1999 | Tsurumi et al. | 84/609 X |
| 5,930,765 A | * | 7/1999 | Martin | 705/14 |
| 5,947,746 A | * | 9/1999 | Tsai | 84/609 X |
| 6,248,946 B1 | * | 6/2001 | Dwek | 84/609 |
| 6,338,044 B1 | * | 1/2002 | Cook et al. | 705/14 |
| 6,351,736 B1 | * | 2/2002 | Weisberg et al. | 705/14 |
| 6,450,407 B1 | * | 9/2002 | Freeman et al. | 705/14 X |

FOREIGN PATENT DOCUMENTS

| | | |
|---|---|---|
| JP | 08-106282 | 4/1996 |
| JP | 11-252645 | 9/1999 |

* cited by examiner

Primary Examiner—Jeffrey Donels
(74) Attorney, Agent, or Firm—Morrison & Foerster LLP

(57) ABSTRACT

A music data providing apparatus comprises a memory that stores a plurality of music data and a plurality of advertisement data, a receiver that receives a request for a desired music data from a user via a network, an advertisement appending device that appends at least one advertisement data among the plurality of advertisement data stored in said memory to the music data corresponding to the received request, and a transmitter that transmits the music data appended with the advertisement data to the user via the network.

21 Claims, 11 Drawing Sheets

SYSTEM AND METHOD FOR DISTRIBUTING MUSIC DATA WITH ADVERTISEMENT

This application is based on Japanese Patent Application 2000-219109, filed on Jul. 19, 2000, the entire contents of which are incorporated herein by reference.

BACKGROUND OF THE INVENTION a) Field of the Invention

The present invention relates to a music data providing system, and more particularly to a music data providing system for providing music data appended with advertisement data via a network.

b) Description of the Related Art

On-demand music data distribution services are provided recently on the Internet from a World Wide Web server to a user terminal or the like. One example of the user terminal is a personal computer. In this case, the personal computer accesses a WWW server via a communication unit such as a modem to download desired music data, and automatically plays the music data by using an external musical tone generator or by running a musical tone generator program.

Another example of a user terminal is an electronic musical instrument (refer to JP-A-8-106282) of the type that can download music data by connecting a communication apparatus such as a modem and automatically play it or etc. When music data is downloaded to such a personal computer or electronic musical instrument, a downloading user is charged with a predetermined price (including fees). The price charged to downloading generally contains a running cost of the download site, and in addition a copyright fee if the music program has a copyright.

Although it is desired to lower a service fee, it is difficult because there are fixed costs such as a cost of creating music data, a maintenance fee of a music data providing system, and a royalty.

SUMMARY OF THE INVENTION

An object of the present invention is to provide a music data providing system which can lower a distribution price for music data by appending advertisement data to the music data and receiving an advertisement fee from the advertiser.

Another object of the present invention is to provide a music data providing system which can advertise efficiently by displaying an advertisement and generating sounds to users of electronic musical apparatus in accordance with advertisement data.

According to one aspect of the present invention, there is provided a music data providing apparatus comprising: a memory that stores a plurality of music data and a plurality of advertisement data; a receiver that receives a request for a desired music data from a user via a network; an advertisement appending device that appends at least one advertisement data among the plurality of advertisement data stored in said memory to the music data corresponding to the received request; and a transmitter that transmits the music data appended with the advertisement data to the user via the network.

According to another aspect of the present invention, there is provided a music data receiving apparatus comprising: a transmitter that transmits a request for a desired music data to a server connected to a network; a receiver that receives an advertisement data and the requested music data transmitted from the server via the network; a display that displays advertisement corresponding to the received advertisement data; and a musical tone generator that generates musical tone in accordance with the received music data.

As above, a distribution price for music data can be reduced by appending advertisement data to the music data and receiving an advertisement fee from the advertiser.

DETAILED DESCRIPTION OF THE PREFERRED EMBODIMENTS

Figure 1:
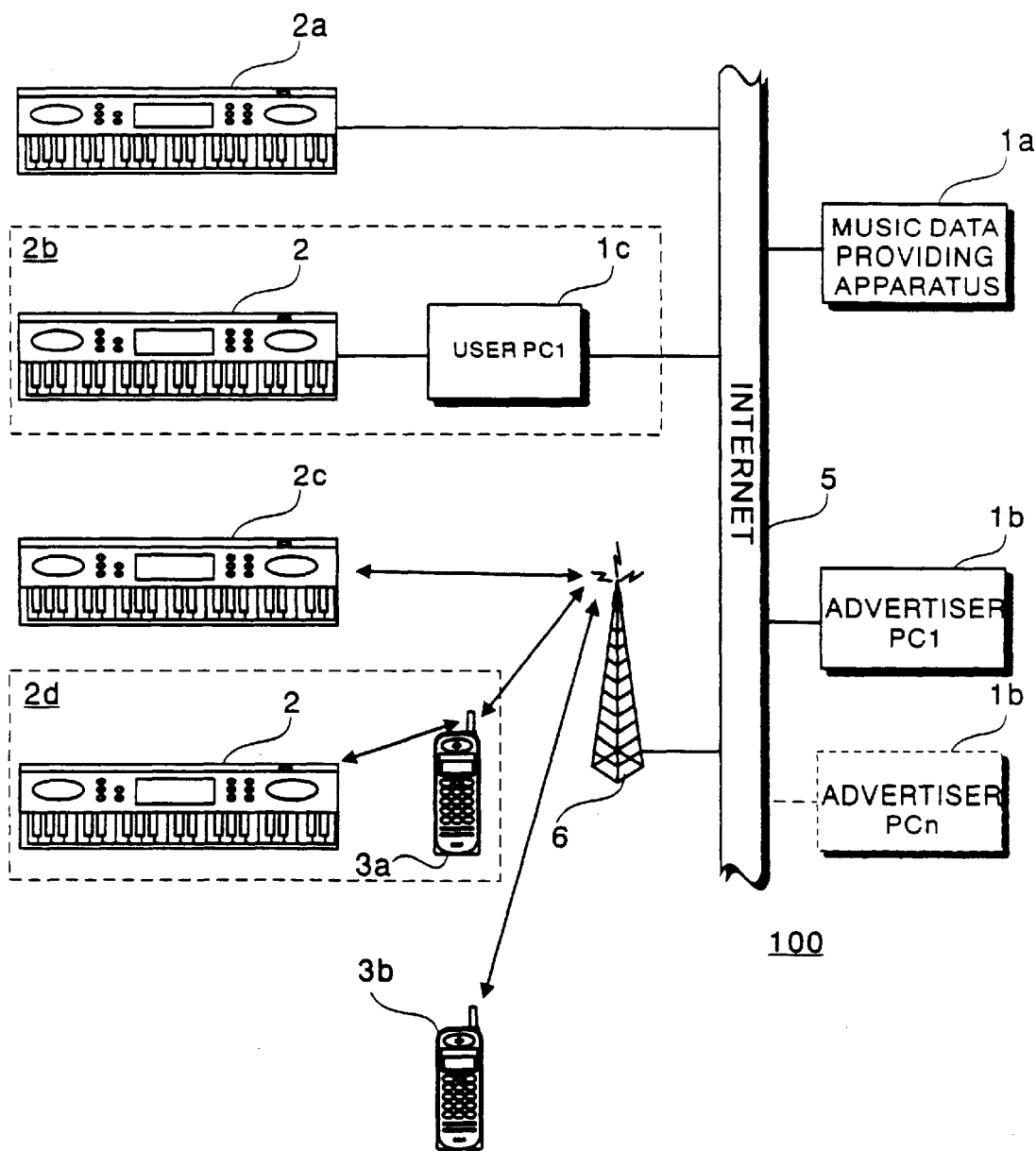
FIG. 1 is a block diagram showing an example of the structure of a music data providing system according to an embodiment of the invention.

FIG. 1 is a block diagram showing an example of the structure of a music data providing system according to an embodiment of the invention. The music data providing system 100 is constituted of a music data providing apparatus 1a, an advertiser terminal apparatus 1b (hereinafter called an advertiser PC) and any one or all of music data receiving apparatus 2a, 2b, 2c and 2d or electronic musical apparatus, respectively interconnected by a network such as the Internet or a communication line.

The music data providing apparatus 1a is, for example, a World Wide Web (WWW) server computer on the Internet. As will be later described, the music data providing apparatus 1a stores a number of music data and advertisement data. The music data providing apparatus 1a provides on-demand services of transmitting stored music data to the music data receiving apparatus 2a to 2d or user terminals in response to user's requests.

As a user downloads music data, a price for the music data is charged to a charging account of the user. In this case, if advertisement data asked by the advertiser is appended to the music data, the price for the music data is automatically reduced. The structure and operation of the music data providing apparatus 1a will be later detailed.

The advertiser PC 1b is made of a computer and is a terminal of an advertiser who requests for an advertisement to be appended to the music data. The advertiser requests for an advertisement by using the advertiser PC 1b. As the advertiser requests for an advertisement, a predetermined fee is charged to the advertiser charging account opened at the music data providing apparatus 1a. In this embodiment, although the fee is charged to the advertiser at the time when the advertiser requests for an advertisement, it may be charged when the advertisement data is actually appended to music data.

In the music data providing system 100 of this embodiment, although only one advertiser PC 1b is connected for the purposes of description simplicity, a plurality of advertiser PC's (PC 1 to PC n) may be connected as shown in FIG. 1.

The music data receiving apparatus 2a is an electronic musical apparatus equipped with a communication interface, as will be later described. A user accesses the music data providing apparatus 1a via the music data receiving apparatus 2a to download music data. As the user downloads the music data, a predetermined price for the music data is charged to the user charging account opened at the music data providing apparatus 1a. In this case, if the user permits appending advertisement data to the music data, the price for the music data is reduced by an amount corresponding to the advertisement fee.

The music data receiving apparatus 2b may be realized by a combination of an electronic musical apparatus 2 and a user terminal computer 1c (hereinafter called a user PC). The music data providing system 100 may utilize wireless communication lines. In this case, a music data receiving apparatus 2c is connected via a wireless receiving station 6 as shown in FIG. 1.

A music data receiving apparatus 2d may be realized by a combination of an electronic musical apparatus 2 having a short distance wireless communication circuit in conformity with the Bluetooth (trademark of The Bluetooth Special Interest Group) specifications or the like and a mobile phone or mobile terminal (hereinafter simply called a mobile phone) 3a having a short distance wireless communication circuit in conformity with the Bluetooth specifications. A mobile phone 3b itself may be used as the music data receiving apparatus.

Figure 2:
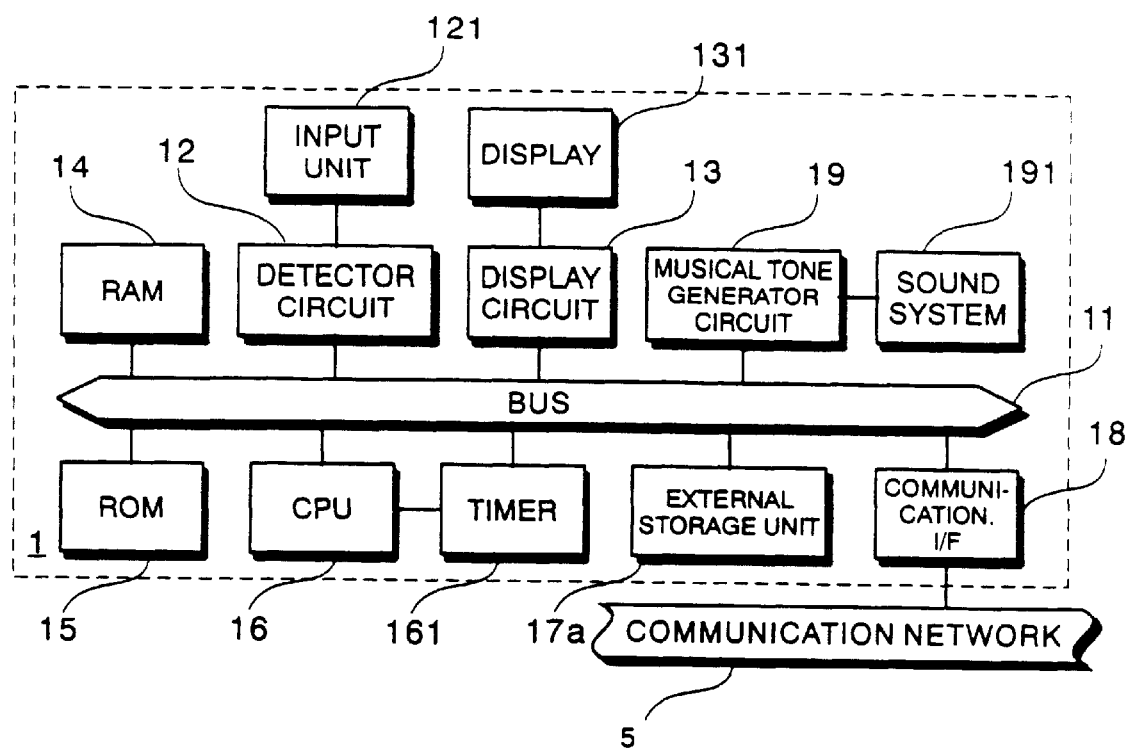
FIG. 2 is a block diagram showing the fundamental structure of a computer.

FIG. 2 is a block diagram showing the fundamental structure of a computer (PC) 1 constituting the music data providing apparatus 1a. In FIG. 2, reference numerals identical to those shown in FIG. 1 generally denote similar structures. The advertiser PC 1b and user PC 1c have generally the same structure as that of the computer 1 constituting the music data providing apparatus 1a, so that the description of the structure of the computer 1 is also applied to PC 1b and PC 1c.

A bus 11 connects a detector circuit 12, a display circuit 13, a RAM 14 (14c for the user PC 1c), a ROM 15, a CPU 16, an external storage unit 17a (17b for the advertiser PC 1b, and 17c for the user PC 1c), a communication interface 18 and a musical tone generator circuit 19.

A user can enter various information or perform other controls by using an operation unit (input unit) 121 connected to the detector circuit 12. The operation unit 121 may be any device capable of outputting signals corresponding to inputs, such as a mouse, a keyboard, a musical keyboard, a joystick, and a switch. A plurality of operation units may be connected.

The display circuit 13 is connected to a display 131 and can display various information on the display 131.

The external storage unit 17a includes an interface for an external storage unit andiskonnected via the interface to the bus 11. The external storage unit 17a may be a floppy disk drive (FDD), a hard disk drive (HDD), a magneto optical disk (MO) drive, a CD-ROM (compact disk read-only memory) drive, or a DVD (Digital Versatile Disk) drive. The external storage unit 17a can store various data such as musical performance data and advertisement data, a music data providing program of the embodiment, and other data.

RAM 14 has working areas for CPU 16 for storing 14 flags, registers, buffers, and various data.

ROM 15 can store various parameters, control programs, the music data providing program of the embodiment and other data. The program and the like are not required to be stored duplicately in the external storage unit 17a. CPU 16 performs calculations or controls in accordance with the music data providing program and the like stored in the external storage unit 17a.

A timer 161 is connected to CPU 16 and the bus 11, and supplies CPU 16 with a main clock signal, interrupt timing and the like.

The musical tone generator circuit 19 generates musical tone signals in accordance with supplied MIDI signals or the like, and supplies the generated musical tone signals to a sound system 191. The sound system 191 includes a D/A converter and speakers, and converts supplied digital musical tone signals into analog musical tone signals to produce sounds.

The musical tone generator circuit 19 may be of any type, such as a waveform memory type, an FM type, a physical model type, a harmonics synthesis type, a formant synthesis type, and an analog synthesizer type having a VCO (Voltage Controlled Oscillator)+VCF (Voltage Controlled Filter)+VCA (Voltage Controlled Amplifier).

The musical tone generator circuit 19 is not limited only to those made of hardware, but may be realized by a DSP (Digital Signal Processor) and a microprogram, by a CPU and a software program, or by a sound card.

One musical tone generator circuit may be used by time sharing to form a plurality of sound producing channels, or a plurality of musical tone generator circuits may be used to form a plurality of sound producing channels by using one musical tone generator circuit per one sound producing channel.

The music data providing program and the like may be stored in a hard disk of the external storage unit 17a. By reading the music data providing program and the like from the hard disk to RAM 14, CPU 16 can perform operations similar to those when the music data providing program and the like are stored in ROM 15. In this case, addition, version-up and the like of the music data providing program and the like can be easily made.

The music data providing program and the like may be stored in a CD-ROM. The music data providing program and the like can be installed from CD-ROM to the hard disk. In this case, addition, version-up and the like of the music data providing program and the like can be easily made.

The communication interface 18 is connectable to a communication network 5 such as a Local Area Network (LAN), the Internet, and a telephone line. The music data providing apparatus 1a is connected via the communication network 5 to other computers 1b and 1c to configure the music data providing system of this embodiment (refer to FIG. 1).

The user PC 1b used as the music data receiving apparatus 2b has a plurality of communication interfaces 18 so that it can be connected to the communication network 5 and other electronic musical instruments, music apparatus and computers. The user PC 1b can be connected at least to the electronic musical apparatus 2. In this case, as the communication interface 14, a general-purpose interface such as RS-232C, Universal Serial Bus (USB), and IEEE 1394 is used.

Figure 3:
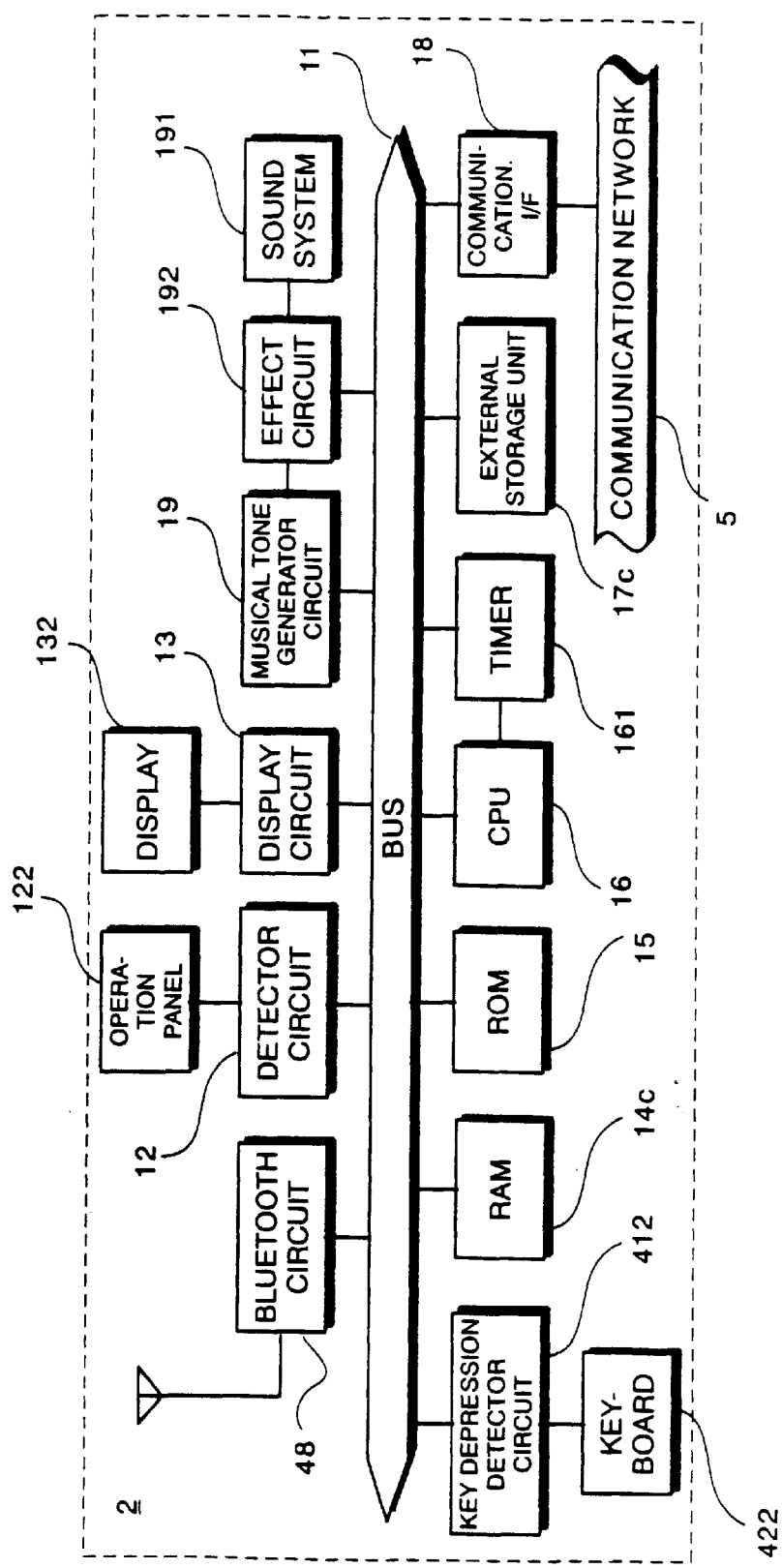
FIG. 3 is a block diagram showing the fundamental structure of a music data receiving apparatus (electronic musical apparatus).

FIG. 3 is a block diagram showing the basic structure of the music data receiving apparatus 2a to 2d (electronic musical apparatus 2) of the embodiment. In FIG. 3, reference numbers identical to those shown in FIG. 1 denote generally the same structures as those shown in FIG. 1 and the descriptions thereof will be omitted.

A bus 11 connects a detector circuit 12, a display circuit 13, a RAM 14c, a ROM 15, a CPU 16, an external storage unit 17c, a communication interface 18, a musical tone generator circuit 19, an effect circuit 192, and a key depression detector circuit 412. A Bluetooth circuit 48 may be connected to the bus 11.

A user can enter various information, download music data, and perform other controls by using an operation panel 122 connected to the detector circuit 12.

A user can also enter various musical tone information and play music by using a keyboard 422 connected to the key depression detector circuit 412.

The display circuit 13 is connected to a display 132 and can display various information on the display 132.

The display 132 displays an advertisement image corresponding to advertisement data, information of music under reproduction, information on downloading music data and the like. A score corresponding to music data, performance data (numerical value, piano roll and the like) and the like can also be displayed.

The external storage unit 17c is similar to the external storage unit 17a of the computer 1 shown in FIG. 2, and can store various data such as music data, advertisement data, and a music data receiving program of this embodiment.

RAM 14c has working areas for CPU 16 for storing flags, registers, buffers and various data such as music data and advertisement data. The storage area of RAM 14c will be later described.

ROM 15 can store various parameters, control programs, the music data receiving program of the embodiment and other data. The program and the like are not required to be stored duplicately in the external storage unit 17c. CPU 16 performs calculations or controls in accordance with control programs and the like stored in ROM 15 or the external storage unit 17c.

A timer 161 is connected to CPU 16, and supplies CPU 16 with a main clock signal, interrupt timing and the like.

Information such as automatic performance music data is stored in the external storage unit 17c, RAM 14c or ROM 15. The information such as music data can be transferred to and from the external via the communication interface 18.

The musical tone generator circuit 19 and a sound system 191 have approximately the same structures as those shown in FIG. 2. The effect circuit 192 gives various effects to supplied musical tone data.

Similar to the computer 1 shown in FIG. 2, the music data receiving program and the like may be stored in a hard disk of the external storage unit 17c or in a CD-ROM.

The communication interface 18 has wired or wireless communication circuits and can be connected to a communication network 5 such as the Internet, similar to the computer 1 shown in FIG. 2. The music data receiving apparatus can access the music data providing apparatus 1a or the like shown in FIG. 1 via the communication network 5, and can download the music data receiving programs, music data, advertisement data or the like from the music data providing apparatus 1a shown in FIG. 1 to the external storage unit 17c such as HDD or in RAM 14c.

The music data receiving apparatus as a client transmits a command to the computer 1 shown in FIG. 2 via the communication interface 18 and communication network 5, the command requesting to download the music data receiving program, music data or the like. Upon reception of this command, the computer 1 shown in FIG. 2 distributes the requested music data receiving program, music data or the like to the music data receiving apparatus via the communication network 5. The music data receiving apparatus receives the music data receiving program, music data or the like and stores it in the external storage unit 17c or RAM 14c to complete downloading.

The communication interface 18 of the electronic musical apparatus 2 used as the music data receiving apparatus 2b shown in FIG. 1 can connect other electronic musical instruments, music apparatus, computers and the like. The communication interface 18 can connect at least the computer 1. In this case, as the communication interface 18, a general-purpose interface is used such as RS-232C, Universal Serial Bus (USB), and IEEE 1394.

In place of the communication interface 18, the Bluetooth circuit 48 is connected to the bus 11 in the electronic musical apparatus 2 used as the music data receiving apparatus 2d shown in FIG. 1. The Bluetooth circuit is a short distance wireless communication circuit in conformity with the Bluetooth specifications or the like and can perform short distance wireless communication with at least a mobile phone or mobile terminal 3. An antenna 49 is connected to the Bluetooth circuit 48.

Figure 4:
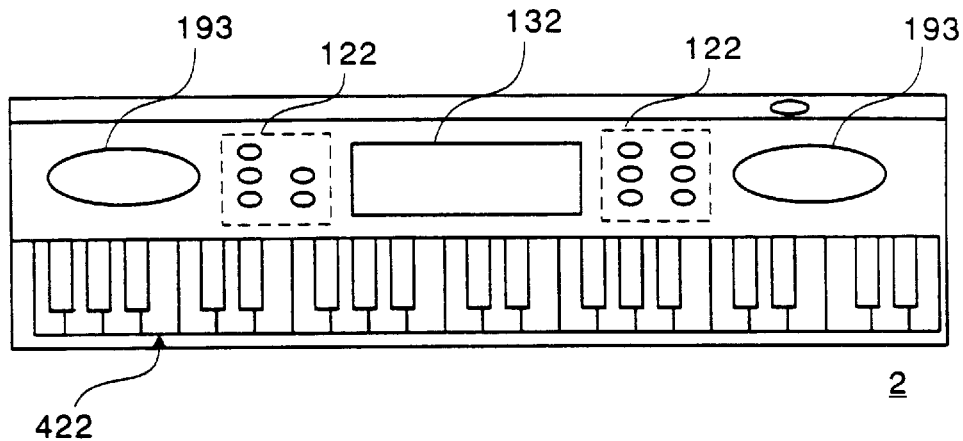
FIG. 4 is a schematic diagram showing an example of the front panel of an electronic musical apparatus.

FIG. 4 is a schematic diagram showing an example of the external appearance of the electronic musical apparatus 2 (music data receiving apparatus 2a and 2c) of the embodiment. In FIG. 4, reference numbers identical to those shown in FIG. 3 denote generally the same structures as those shown in FIG. 3.

A display 132 is disposed in the upper middle of the electronic musical apparatus 2, and a plurality of operation panels 122 are disposed in the upper right and left. Speakers 193 are disposed right and left outside of the operation panels 122. The speakers 193 constitute the sound system 191 shown in FIG. 3. A (piano like) keyboard 422 is disposed in the lower half of the electronic musical apparatus 2.

Figure 5:
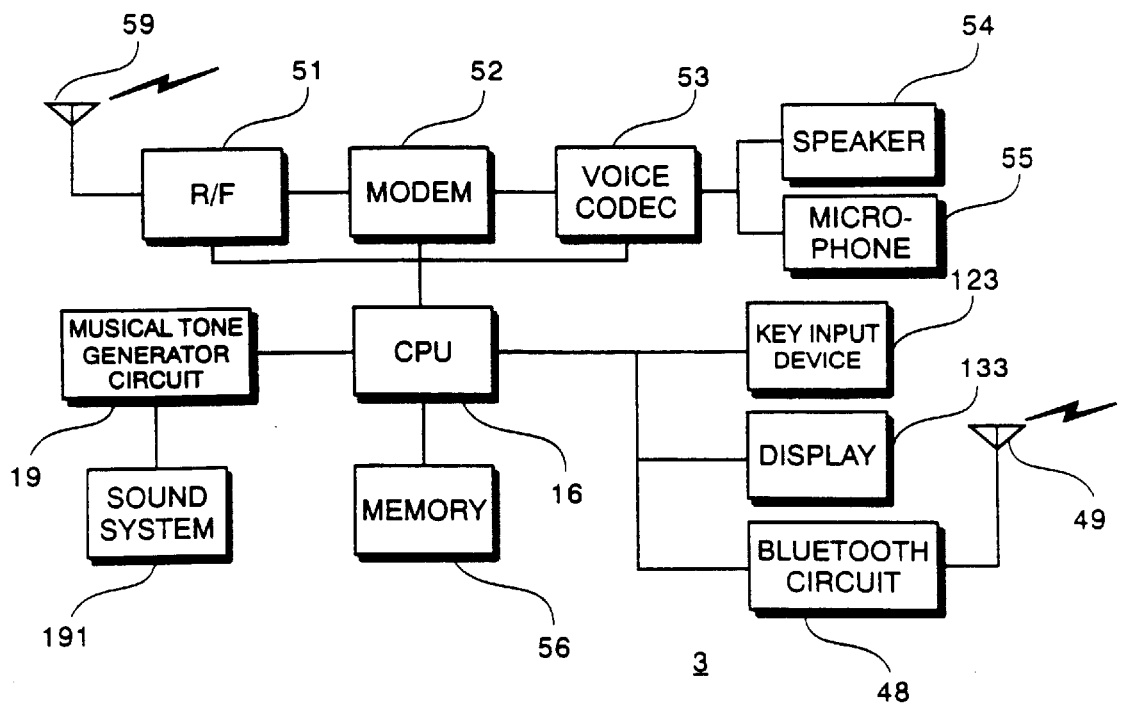
FIG. 5 is a block diagram showing the fundamental structure of a mobile phone or a portable terminal.

FIG. 5 is a block diagram showing the fundamental structure of the mobile phone or mobile terminal 3 of the embodiment. In FIG. 5, identical reference numbers to those shown in FIG. 3 denote generally the same structures as those shown in FIG. 3.

The mobile phone or mobile terminal 3 has: an R/F unit 51 which is a head amplifier for wireless communication radio waves received at an antenna 59; a modem 52 for modulation and demodulation through coding; a voice codec 53 for coding and decoding of voice data; a speaker 54 for voice output during speech; a microphone 55 for voice input during speech; a CPU 16; a memory 56; a musical tone generator circuit 19; a sound system 191; a key input device 123; a display 133; a Bluetooth circuit 48; and antennas 49 and 59.

CPU 16 controls the whole of the mobile phone or mobile terminal 3 in accordance with a control program stored beforehand in the memory 56. The memory 56 stores the control program, and in addition, information of a telephone number, a name and the like, downloaded music data, advertisement data and the like.

The musical tone generator circuit 19 and sound system 191 are similar to those shown in FIGS. 2 and 3. The musical tone generator circuit 19 for mobile phones has generally the number of simultaneous reproduction sounds smaller than that of an electronic musical instrument. The musical tone generator circuit 19 is used for reproduction of downloaded music data, advertisement data and the like, and a calling melody and the like. The sound system 191 amplifies music data generated by the musical tone generator circuit 19, and produces sounds from a speaker different from the speaker 54 for voice output during a talk.

The key input device 123 is used for entering telephone numbers, various commands and the like. A user can download music data or the like by operating this key input device 123.

The display 133 displays data necessary for the mobile phone such as a telephone number, an advertisement image corresponding to advertisement data to be described later, information of music under reproduction such as a title, information of downloading music data and the like.

The Bluetooth circuit 48 and antenna 49 constitute a short distance wireless communication circuit in conformity with the Bluetooth specifications or the like, and can have short distance wireless communication with at least the electronic musical apparatus 2 used as the music data receiving apparatus 2d. The music data receiving apparatus 3b which is not necessary to have short distance wireless communication with the electronic musical apparatus 2 may not be equipped with the Bluetooth circuit 48 and antenna 49.

Figure 6C:
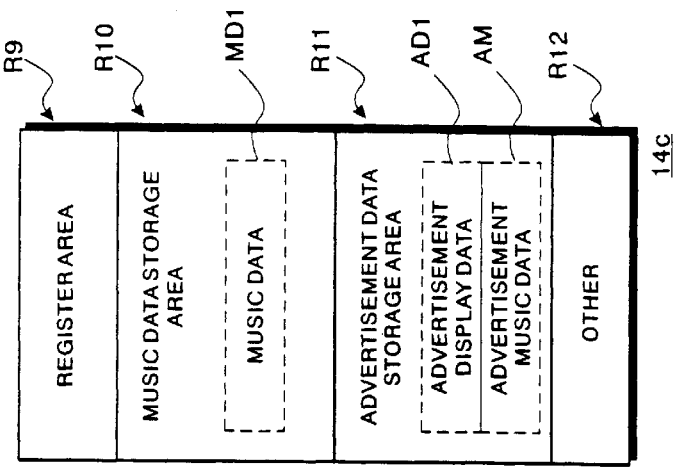
FIGS. 6A, 6B and 6C are diagrams showing data in each storage area.
Figure 6B:
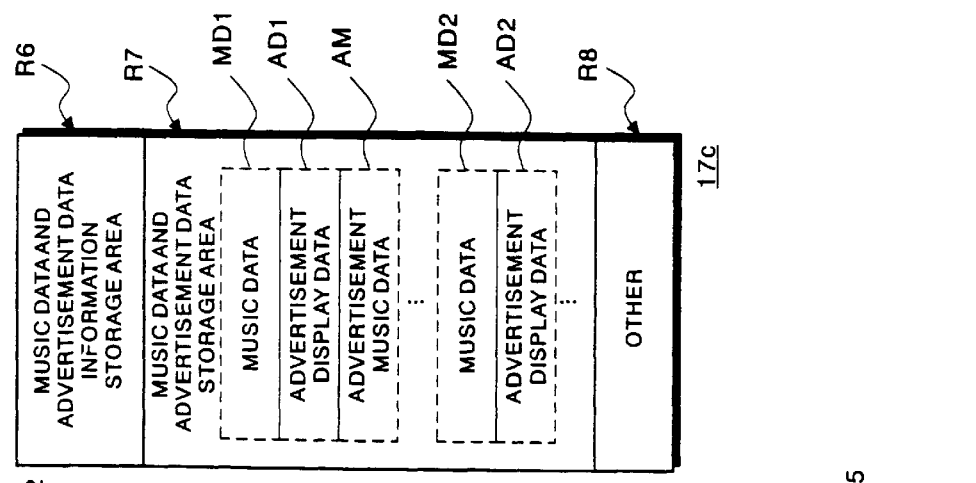
Figure 6A:
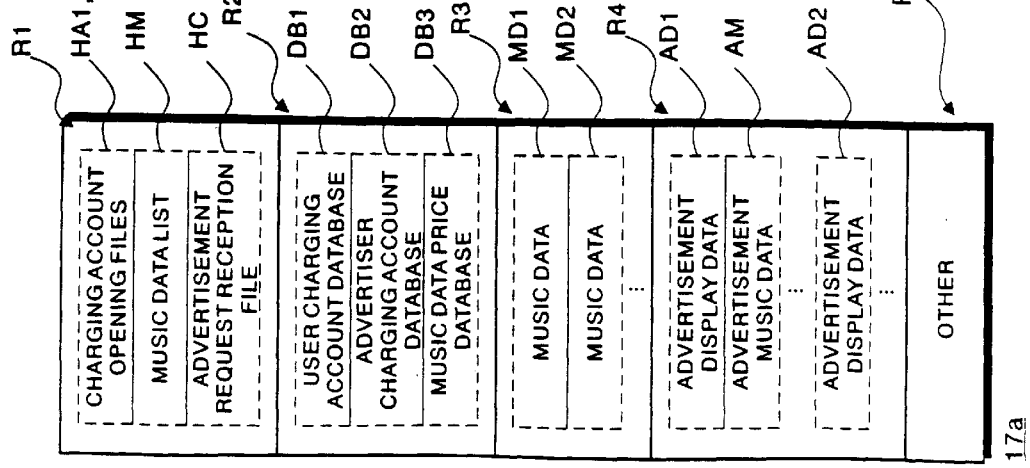

FIGS. 6A to 6C are diagrams showing data in storage areas of the external storage unit 17a of the music data providing apparatus 1a, and of the external storage unit 17c of the music data receiving apparatus 2a–2d, and RAM 14c.

FIG. 6A is a diagram showing data in the storage areas of the external storage unit 17a of the music data providing apparatus 1a. The storage areas of the external storage unit 17a of the music data providing apparatus 1a are constituted of, at least an Hyper Text Markup Language (HTML) file area R1, a database area R2, a music data area R3, an advertisement data area R4 and another area R5.

The HTML file area R1 stores charging account opening files HA1 and HA2, a music data list HM, an advertisement request reception file HC and the like, respectively in the HTML format. This HTML files are specific files provided to a user or an advertiser when the user or advertiser accesses the music data providing apparatus.

For example, the charging account opening files HA1 and HA2 are HTML files used for urging a user or an advertiser to enter data necessary for opening a charging account to which a price for goods and services of the embodiment is charged, and for urging the user or advertiser to enter charging account information (e.g., user name, password and the like) if the user or advertiser has already the charging account. In accordance with the instruction by this file, a user or advertiser inputs either the charging account information or personal information including at least the charging account information and a charging method necessary for newly opening the charging account.

A method of charging a user or advertiser of the music data providing apparatus 1a may be a usual method. A credit card number may be input to charge from its account, or the number of a prepaid card may be input to subtract a price from the prepaid money amount.

The charging account opening file HA1 is used for confirming or opening a charging account (hereinafter called a user charging account) to allow the user to download music data. The charging account opening file HA2 is used for confirming or opening a charging account (hereinafter called an advertiser charging account) to allow the advertiser to request for an advertisement. Data of an opened user charging account is stored in a user charging account database DB1 in the database area R2, and data of an opened advertiser charging account is stored in an advertiser charging account database DB2 in the database area R2.

The music data list HM is an HTML format file of a list of music data stored in the music data area R3 of the music data providing apparatus 1a. A user selects a desired music program from the music data list and downloads it. The music data list HM not only displays the list of music data but also makes a user to determine whether advertisement data is to be appended.

The advertisement request reception file HC is an HTML file used for an advertiser to enter data necessary for requesting for an advertisement, this file being transmitted from the music data providing apparatus 1a to the advertiser PC 1b. In accordance with the instruction described in the advertisement request reception file HC, the advertiser enters data necessary for requesting for an advertisement.

For example, the data necessary for the advertisement request includes: advertisement terms on whether only an advertisement display or both the advertisement display and advertisement sounds are to be selected (hereinafter simply called advertisement terms); text data or image data for the advertisement display (hereinafter called advertisement data AD); sound data or musical tone data for producing advertisement sounds (hereinafter called advertisement tone data AM); and the like. The input advertisement data AD and advertisement tone data AM are stored in the advertisement data area R4, and identifiers such as file names of the input advertisement data AD and advertisement tone data AM as well as storage locations thereof are stored in the advertiser charging account database DB2.

By using the advertisement request reception file HC, music data to which an advertisement is appended may be selected. In this case, an advertisement can be appended to a musical program suitable for images of the advertisement or for corporation images.

In the database area R2, the advertiser charging account database DB2, user charging account database DB1 and music data price database DB3 are stored. As described earlier, the user charging account database DB1 and advertisement charging account database DB2 store information on users and advertisers, respectively, and can be referred to or altered when necessary.

The music data price database DB3 stores fees for the music data stored in the music data area R3. If the same price is set to all the music data, this music data price database DB3 is not necessary. However, it is necessary to store at least one price to be charged when a user downloads music data.

The music data area R3 stores music data MD downloadable by a user. The music data MD is preferably MIDI data in the standard MIDI file (SMF) format. By using MIDI data, it becomes possible to effectively use the storage area and shorten the time taken to download the music data MD.

Figure 12A:
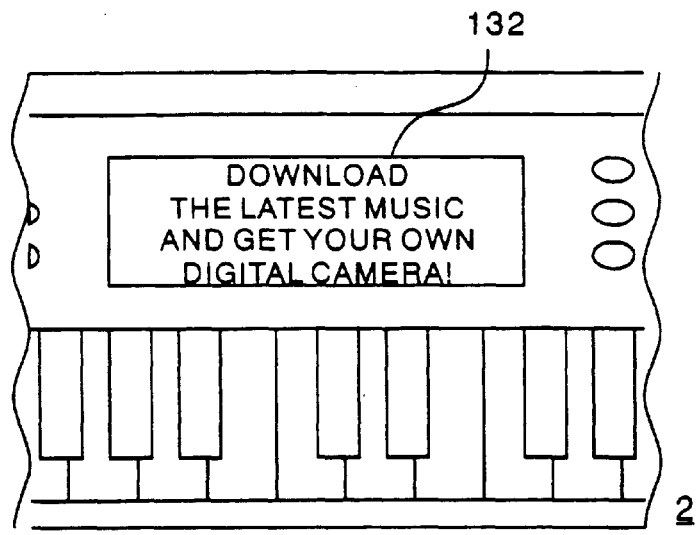
FIGS. 12A, 12B and 12C are diagrams showing example of displayed advertisements.
Figure 12B:
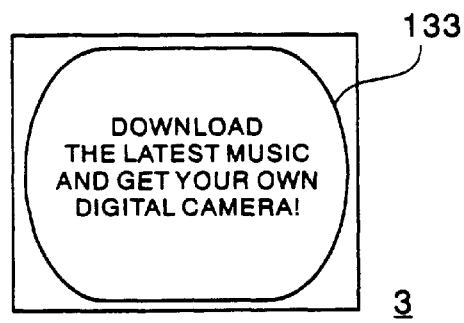

The advertisement data area R4 stores advertisement data such as advertisement display data AD and advertisement music data AM. As shown in FIG. 12A, the advertisement display data AD is text data for displaying an advertisement on the display 132 of the music data receiving apparatus 2a–2d (electronic musical apparatus 2). Alternatively, as shown in FIG. 12B, the advertisement display data AD is text data for displaying an advertisement on the display 133 of the mobile phone 3. Any data may be used as the advertisement display data AD so long as it can be displayed on the display 132 or 133. For example, the advertisement display data AD may be still image data, moving image data or both text data and image data.

The other area R5 stores various control programs such as programs for a music data providing process and an advertisement request reception process to be later described, and other data.

FIG. 6B is a diagram showing data in the storage areas of the external storage unit 17c of the music data receiving apparatus 2a–2d. The storage areas of the external storage unit 17c of the music data receiving apparatus 2a–2d are constituted of at least a music data and advertisement data information storage area R6, a music data and advertisement data storage area R7 and another area R8.

The music data and advertisement data information storage area R6 stores the music program name (or an identifier such as a file name), storage location and data size as well as the presence/absence of corresponding advertisement data AD or AM, storage location and size, respectively for each of a plurality of music data MD stored in the music data and advertisement data storage area R7.

The music data and advertisement data storage area R7 stores music data MD1 downloaded from the music data providing apparatus 1a by a downloading process to be described later, and corresponding advertisement display data AD1 and advertisement music data AM. It also stores music data MD2 and corresponding advertisement display data AD2.

The other area R8 stores various control programs such as programs for executing a music data receiving process, a downloading process and an automatic performance process to be described later, and other data.

FIG. 6C is a diagram showing data in the storage areas of RAM 14c of the music data receiving apparatus 2a–2d. The storage areas of RAM 14c of the music data receiving apparatus 2a–2d are constituted of at least a register area R9, a music data storage area R10, an advertisement data storage area R11 and general-purpose area R12.

The register area R9 stores a program name, storage location and data size as well as the presence/absence of corresponding advertisement data AD or AM, storage location and data size, respectively for active music data MD1 which is currently automatically reproduced or is currently selected to be reproduced.

The music data storage area R10 temporarily stores the active music data MD1.

The advertisement data storage area R11 temporarily stores the advertisement display data AD1 and advertisement music data AM corresponding to the active music data MD1.

The general-purpose area R12 is used for other purposes such as a working area for CPU 16 (FIG. 3).

The music data MD may be stored in such a manner that time sequential performance data is stored in the consecutive areas of RAM 14c or the external storage unit 17c, or data stored in discrete and skipped areas may be managed as continuous data. Namely, it is sufficient if data can be managed as time sequentially continuous data, and it is not necessary to be stored physically continuously in RAM 14c or in the external storage unit 17c.

The music data MD of a plurality of channels may be stored in the format that data of a plurality of channels is stored at one track or in the format that data of each channel is stored divisionally at respective tracks.

Figure 7:
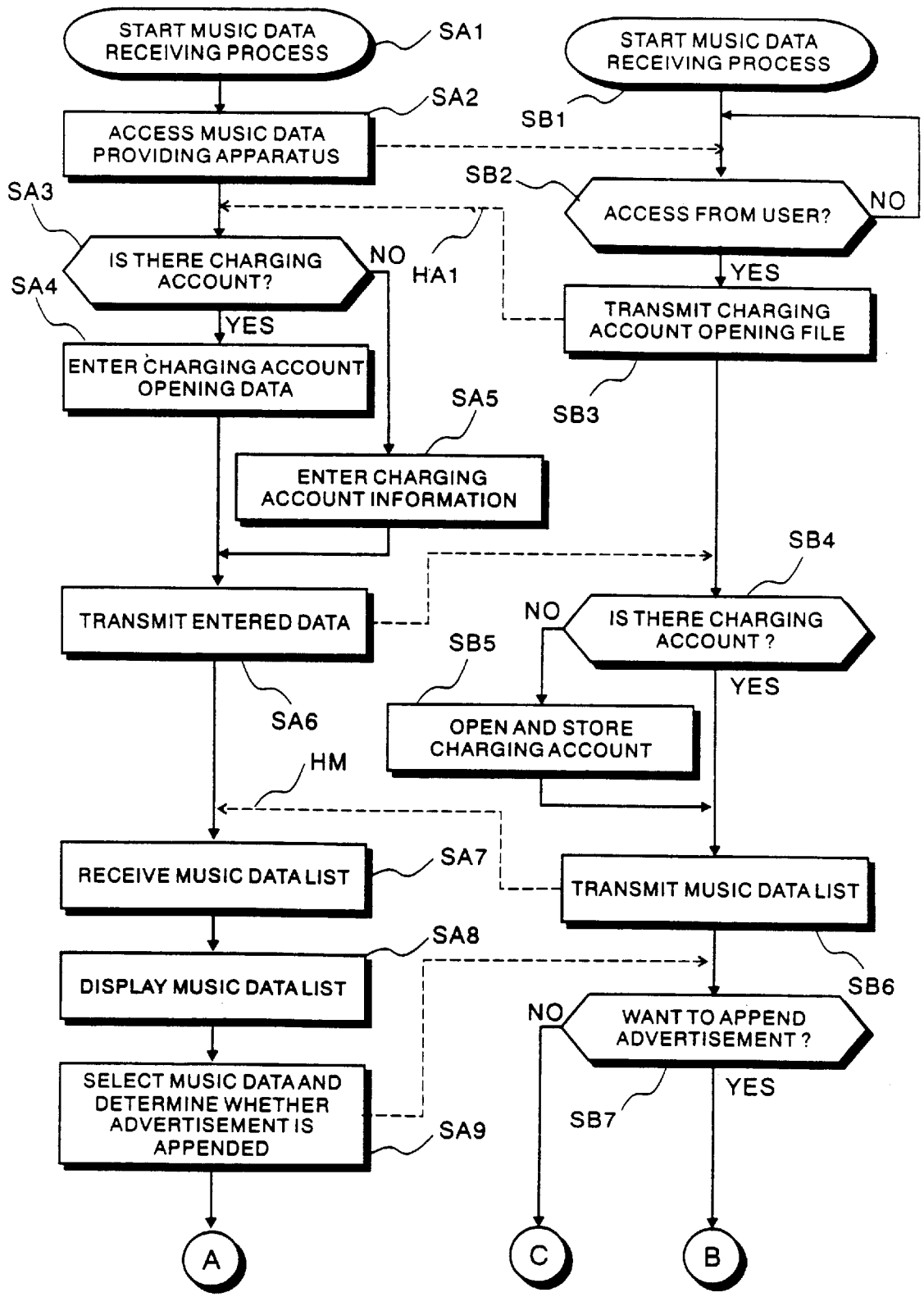
FIGS. 7 and 8 are flow charts illustrating music data providing and receiving processes.
Figure 8:
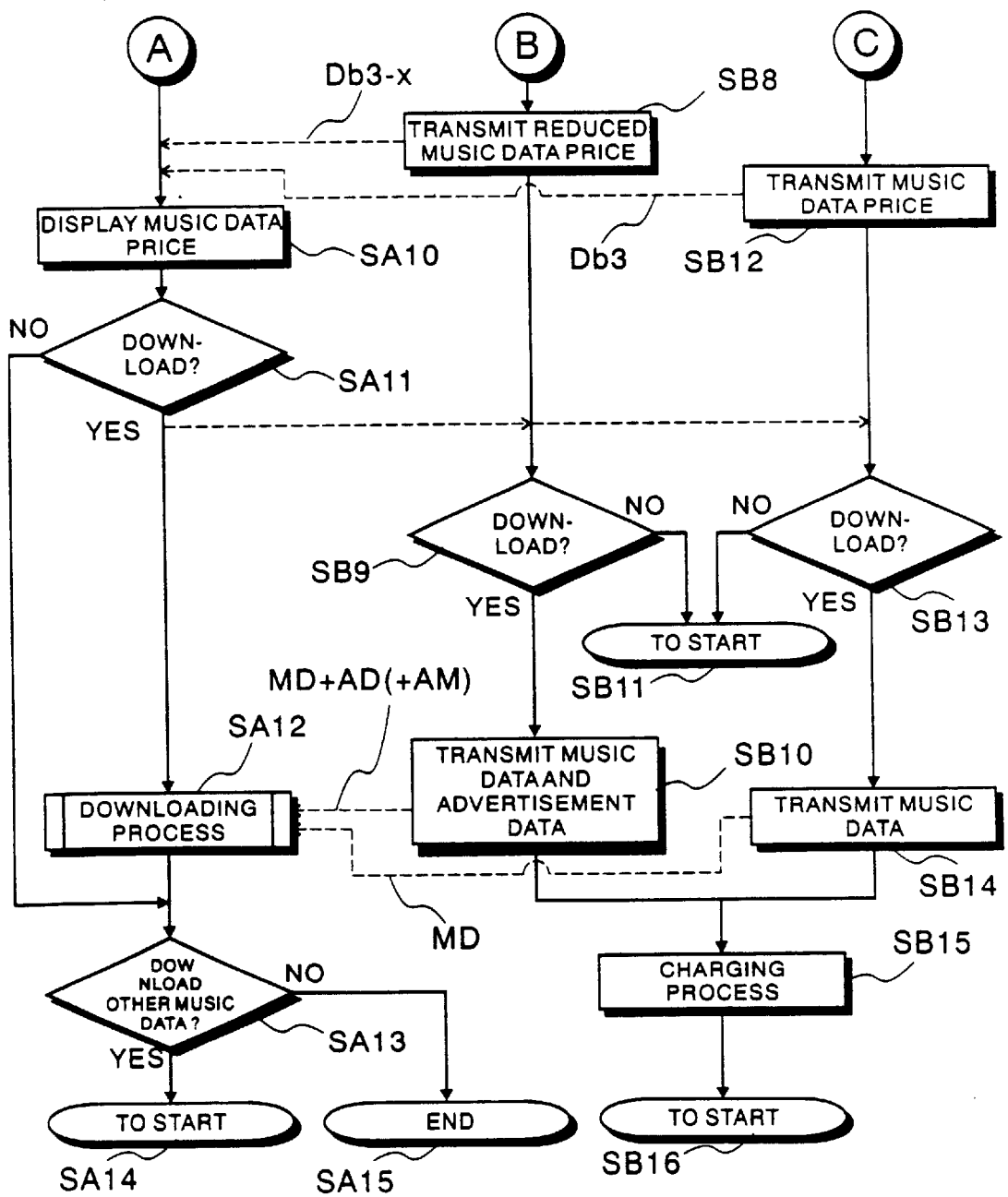

FIGS. 7 and 8 are flow charts illustrating the music data receiving process and corresponding music data providing process. The music data receiving process is executed by CPU 16 of the electronic musical apparatus 2 shown in FIG. 3 constituting the music data receiving apparatus 2a–2d or 3b shown in FIG. 1 (or by CPU 16 of the mobile phone 3 shown in FIG. 5). The music data providing process is executed by CPU 16 of the music data providing apparatus 1a shown in FIG. 2, in parallel with the music data receiving process.

First, with reference to FIGS. 1 and 3, FIGS. 6A to 6C, and FIGS. 7 and 8, the music data receiving process will be described which is executed by CPU 16 of the electronic musical apparatus 2 shown in FIG. 3 constituting the music data receiving apparatus 2a–2d or 3b shown in FIG. 1 (or by CPU 16 of the mobile phone 3 shown in FIG. 5). In the following, although the description is mainly directed to the case that the electronic musical apparatus 2 is used as the music data receiving apparatus, the fundamental process does not differ even for the case that the mobile phone 3 is used as the music data receiving apparatus 3b.

At Step SA1, the music data receiving process starts to advance to the next Step SA2.

At Step SA2, a user enters the Uniform Resource Locator (URL) of the music data providing apparatus 1a to access the apparatus 1a via the Internet (communication network) 5. For example, for the access from the music data receiving apparatus 2d, first the electronic musical apparatus 2 transmits URL to the mobile phone 3a through wireless communications, and the mobile phone 3a transmits URL to the Internet 5 through wireless communications to access the music data providing apparatus 1a. Thereafter, the flow advances to the next Step SA3.

At Step SA3, the user receives the charging account opening file HA1 from the music data providing apparatus 1a and enters a presence/absence of the charging account. If the user has already the charging account, the flow advances to the next Step SA4 as indicated by a YES arrow, whereas if the user has no charging account, the flow advances to Step SA5 as indicated by a NO arrow.

At Step SA4, the user is urged to enter charging account information. The charging account information is information such as a user name and a password for confirming the identity of the user. The charging account information may be stored in the external storage unit 17c of the electronic musical apparatus 2. In this case, it is not necessary for the user to enter the charging account information. After the charging account information is entered, the flow advances to the next Step SA6.

At Step SA5, the user is urged to enter charging account opening data. The charging account opening data is required in order to open a new user charging account, and includes at least information such as a user name and a password for confirming the identity of the user and a charging method. Thereafter, the flow advances to the next Step SA6.

At Step SA6, the data entered by the user at Step SA4 or SA5 is transmitted to the music data providing apparatus 1a. Thereafter, the flow advances to the next Step SA7.

Whether the charging account is already present may be automatically detected at Step SA3. In that case, after it is detected that the charging account is already present, the charging account information is automatically transmitted at Step SA4 without waiting for a user input to thereafter advance to Step SA7. If it is detected that the charging account is not present, the flow advances to Step SA5.

At Step SA7, the user receives the music data list HM from the music data providing apparatus 1a. Thereafter, the flow advances to the next Step SA8.

At Step SA8, the music data list HM received at Step SA7 is displayed on the display 132 of the electronic musical apparatus 2. Thereafter, the flow advances to the next Step SA9.

At Step SA9, the user is urged to select music data desired to be downloaded, from the received music data list HM. After the user selects music data, the user is further urged to determine whether the advertisement is appended to the selected music data. After the user determines whether the advertisement is to be appended, information on the selected music data and the determination of whether the advertisement is appended is transmitted to the music data providing apparatus 1a. Thereafter, the flow advances to the next Step SA10.

At Step SA10, the user receives a music data price (Db3) or a music data price (Db3-x) which is the music data price (Db3) reduced by an advertiser charge (x), depending upon the user determination of whether the advertisement is appended, to thereby display the download price for the music data selected at Step SA9 on the display 132. Thereafter, the flow advances to the next Step SA11.

At Step SA11, the user is urged to determine whether the selected music data is actually downloaded. If the user determines to download it, a download request is transmitted to the music data providing apparatus 1a to thereafter advance to the next Step SA12 as indicated by a YES arrow. If the user does not determine to download it, a message that the music data is not downloaded is transmitted to thereafter advance to Step SA13 as indicated by a NO arrow.

At Step SA12, a downloading process to be described later is executed.

At Step SA13, the user is urged to determine whether other music data is downloaded. If the user determines to download, the flow advances to the next Step SA14 as indicated by a YES arrow to execute again the music data receiving process starting from Step SA1. If the user does not determine to download, the flow advances to Step SA15 as indicated by a NO arrow to terminate the music data receiving process.

Next, with reference to FIGS. 1 and 2, FIGS. 6A to 6C, and FIGS. 7 and 8, the music data providing process will be described which is executed by CPU 16 of the music data providing apparatus 1a (computer 1).

At Step SB1, the music data providing process starts to advance to the next Step SB2.

At Step SB2 it is checked whether there is any access from a user (music data receiving apparatus). If there is an access from the music data receiving apparatus, the flow advances to the next Step SB3 as indicated by a YES arrow. If there is no access from the music data receiving apparatus, Step SB2 is repeated as indicated by a NO arrow until an access from the music data receiving apparatus occurs.

At Step SB3, the charging account opening file is transmitted to the music data receiving apparatus. Thereafter, the flow advances to Step SB4.

At Step SB4, the music data providing apparatus 1a receives either the charging account information or the charging account opening data from the music data receiving apparatus. If the charging account information is received, it can be known that the accessing user has already a charging account. In this case, therefore, the user name, password and the like are verified by using the user charging account database DB1 to thereafter advance to Step SB6 as indicated by a YES arrow.

If the charging account opening data is received, it can be known that the accessing user wishes to open a new charging account. Therefore, the flow advances to the next Step SB5 as indicated by a NO arrow.

At Step SB5, in accordance with the charging account opening data received at Step SB4, a user charging account is opened and stored in the user charging account database DB1. Thereafter, the flow advances to the next Step SB6.

At Step SB6, the music data list HM is transmitted to the music data receiving apparatus. Thereafter, the flow advances to the next Step SB7.

At Step SB7, the music data providing apparatus 1a receives the information of the music data selected at Step SA9 and transmitted in the music data receiving process and the determination of whether the advertisement is appended. After the information is received, the flow advances to the next Step SB8 as indicated by a YES arrow if the user wished to append the advertisement, whereas the flow advances to Step SB14 as indicated by a NO arrow if the user did not wish to append the advertisement.

At Step SB8, the music data price (Db3-x) is transmitted to the music data receiving apparatus, the music data price (Db3-x) is the music data price (Db3) of the music data selected by the user, reduced by the advertiser charge (x) incurred upon the advertiser. Thereafter, the flow advances to the next Step SB9. For example, if the music data price (Db3) is 300 Yen and the advertiser charge (x) is 200 Yen, the price actually to be paid by the user (the price charged to the user charging account) is a reduced music data price (Db3-x), i.e., 100 Yen. The advertiser charge (x) is settled by the advertisement fee collected from the advertiser.

The advertiser charge (x) may be changed depending upon the kind of appended advertisement data. For example, if the advertisement data and advertisement music data are appended, the advertiser charge (x) may be raised more than that only the advertisement data is appended.

Further, the advertiser charge (x) may also be changed depending upon the advertisement data display method or advertisement music data performance method. Specifically, as described later, if the advertisement is displayed or advertisement music data is reproduced only when the music data is downloaded, the advertiser charge (x) may be lowered, whereas if the advertisement is displayed or advertisement music data is reproduced every time when the music data is reproduced, the advertiser charge (x) may be raised.

In such cases, at Step SA9 of the music data receiving process described earlier, the user may be urged to determine whether the advertisement is appended in what advertisement pattern. Alternatively, fees for various advertisement patterns may be contained in the reduced music data price (Db3-x) to be transmitted at Step SB8 to allow the user to select a desired advertisement pattern.

At Step SB9, in accordance with the user determination at Step SA11 of the music data receiving process, the music data providing apparatus 1a receives a download request or the information of not to download, from the electronic musical apparatus 2. Upon reception of the download request, the flow advances to the next Step SB10. Upon reception of the information of not to download, the flow advances to Step SB11 whereat the flow returns to Step SB1 to resume the music data providing process.

At Step SB10, the music data MD selected by the user and appended with the advertisement display data AD (or advertisement data AD and advertisement music data AM) is transmitted to the electronic musical apparatus 2. In this case, the advertisement data AD (or advertisement data AD and advertisement music data AM) is transmitted first before the music data MD is transmitted. The music data MD is transmitted after the transmission of the advertisement data AD (or advertisement data AD and advertisement music data AM) is completed. Thereafter, the flow advances to Step SB15.

The advertisement data AD (or advertisement data AD and advertisement music data AM) is automatically selected from a plurality of such data stored in the external storage unit 17a of the music data providing apparatus 1a.

It is preferable that the advertisement data AD (or advertisement data AD and advertisement music data AM) already downloaded by the same user is not downloaded.

If there is the advertisement music data AM, the advertisement display data AD is first transmitted. In this manner, it becomes possible to display an advertisement corresponding to the advertisement display data during downloading the succeeding data.

Prior to transmitting each data, identification data for identifying the type of data or the like may be transmitted. In this manner, it becomes possible for the music data receiving apparatus to recognize the type of data or the like before the data is actually downloaded.

The music data MD transmitted at Step SB10 is the MIDI format data (SMF file). If the mobile phone 3 is used as the music data receiving apparatus, the music data MD of the MIDI format stored in the external storage unit 17a of the music data providing apparatus 1a is transmitted after it is converted into the format capable of being reproduced by the mobile phone 3. Similarly, the advertisement display data AD and advertisement music data AM are also transmitted after they are converted into the format capable of being reproduced by the mobile phone 3. The music data, advertisement display data and advertisement music data capable of being reproduced or displayed by the mobile phone 3 may be prepared beforehand to make format conversion unnecessary.

At Step SB12, the music data price (Db3) for the music data selected by the user is transmitted to the music data receiving apparatus. Thereafter, the flow advances to Step SB13. In this case, the reduced music data price (Db3-x) with an appended advertisement may be transmitted together with the music data price (Db3). If the user looking at the reduced music data price (Db3-x) with an appended advertisement desires to append the advertisement, the flow may be structured to advance to Step SB9.

At Step SB13, in accordance with the user determination at Step SA11 of the music data receiving process, the music data providing apparatus 1a receives the download request or the information of not to download, from the electronic musical apparatus 2. Upon reception of the download request, the flow advances to the next Step SB14. Upon reception of the information of not to download, the flow advances to Step SB11 whereat the flow returns to Step SB1 to resume the music data providing process.

At Step SB14, the music data MD selected by the user is transmitted to the electronic musical apparatus 2. Thereafter, the flow advances to Step SB15.

At Step SB15, the charging process is executed to the user charging account. The charging price changes with whether the transmitted music data was appended with the advertisement data or not. If the advertisement data is not appended, the original music data price (Db3) is charged to the user charging account. If the advertisement data is appended, the reduced music data price (Db-x) is charged to the user charging account. Thereafter, the flow advances to the next Step SB16.

At Step SB16, the flow returns to Step SB1 to resume the music data providing process.

Figure 9:
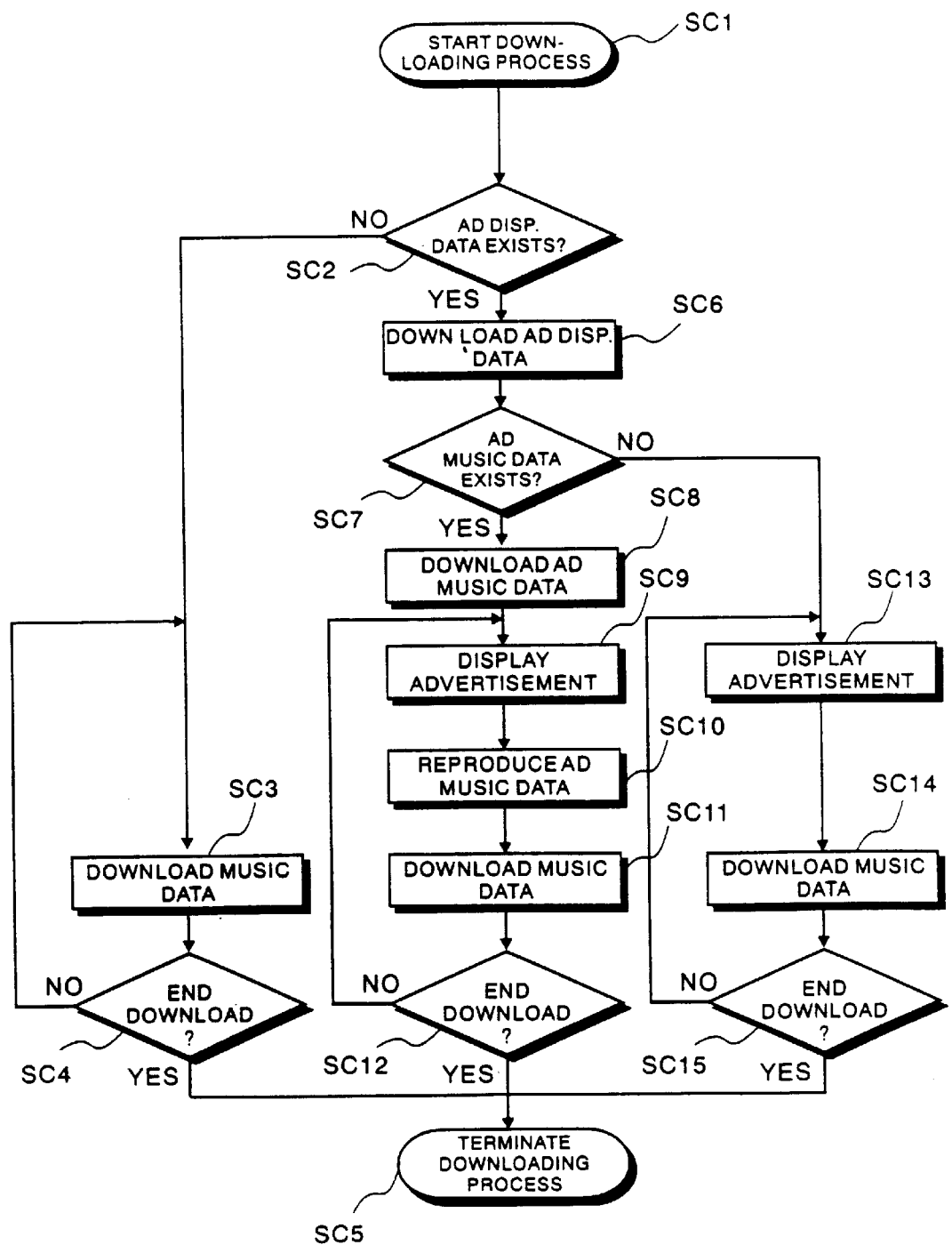
FIG. 9 is a flow chart illustrating a music data downloading process.

FIG. 9 is a flow chart illustrating the downloading process at Step SA12 shown in FIG. 8 to be executed by CPU 16 of the electronic musical apparatus 2 shown in FIG. 3 (or mobile phone 3 shown in FIG. 5) constituting the music data receiving apparatus 2a–2d or 3b shown in FIG. 1. In the following, although the description is mainly directed to the case that the electronic musical apparatus 2 is used as the music data receiving apparatus, the fundamental process does not differ even for the case that the mobile phone 3 is used as the music data receiving apparatus 3b.

At Step SC1, the downloading process starts to advance to the next Step SC2.

At Step SC2, it is checked whether the advertisement display data AD is appended to the data to be transmitted from the music data providing apparatus 1a. Since the advertisement display data AD is transmitted before the music data MD is transmitted, it is checked whether the data first received is the advertisement display data AD. If the advertisement data AD is appended, the flow advances to Step SC6 as indicated by a YES arrow. If the advertisement data AD is not appended, the flow advances to Step SC3 as indicated by a NO arrow. Whether the advertisement display data AD is appended or not may be checked by using identification data in a header which data indicates the type of data transmitted from the music data providing apparatus 1a.

At Step SC3, downloading the music data MD starts. As the music data MD is downloaded, it is stored in the music data storage area R10 of RAM 14c, and after a predetermined amount of data is downloaded or after the completion of downloading, it is stored in the music data and advertisement data storage area R1 of the external storage unit 17c. The music data MD may be directly stored in the external storage unit 17c. Thereafter, the flow advances to Step SC4.

At Step SC4, it is checked whether downloading the music data MD is completed or not. If not, the flow returns to Step SC3 as indicated by a NO arrow to continue downloading of the music data MD. If downloading of the music data is completed, the flow advances to Step SC5 as indicated by a YES arrow.

At Step SC5, the downloading process is terminated. Next, the description will be given for the case that it is judged at Step SC2 that there is advertisement display data and the flow advances to Step SC6 from Step SC2 as indicated by a YES arrow.

At Step SC6, downloading the advertisement display data AD starts. As the advertisement display data AD is downloaded, it is stored in the advertisement data storage area R11 of RAM 14c, and after a predetermined amount of data is downloaded or after the completion of downloading, it is also stored in the music data and advertisement data storage area R7 of the external storage unit 17c. After the advertisement data AD is downloaded, the flow advances to Step SC7.

At Step SC7, it is checked whether the advertisement music data AM is appended to the data to be transmitted from the music data providing apparatus 1a. Since the advertisement music data MD is transmitted after the advertisement display data AD is downloaded and before the music data MD is transmitted, it is checked whether the data first received is the advertisement music data MD. If the advertisement music data MD is appended, the flow advances to Step SC8 as indicated by a YES arrow. If the advertisement music data MD is not appended, the flow advances to Step SC13 as indicated by a NO arrow. Whether the advertisement music data MD is appended or not may be checked by using identification data indicating the type of data transmitted from the music data providing apparatus 1a.

At Step SC8, downloading the advertisement music data AM starts. As the advertisement music data AM is downloaded, it is stored in the advertisement data storage area R11 of RAM 14c, and after a predetermined amount of data is downloaded or after the completion of downloading, it is also stored in the music data and advertisement data storage area R7 of the external storage unit 17c. After the advertisement music data AM is downloaded, the flow advances to the next Step SC9.

At Step SC9, an advertisement is displayed on the display 132 by using the advertisement display data AD downloaded at Step SC6 and stored in RAM 14c. A display of the advertisement display data AD on the display 132, may be that shown in FIG. 12A. If the mobile phone 3 is used as the music data receiving apparatus 3b, as shown in FIG. 12B advertisement by the advertisement display data AD is displayed on the display 133. After the advertisement is displayed, the flow advances to the next Step SC10.

At Step SC10, the advertisement music data AM downloaded at Step SC8 and stored in RAM 14c is reproduced to thereafter advance to the next Step SC11.

At Step SC11, downloading the music data MD starts. This operation is similar to that at Step SC3. Thereafter, the flow advances to the next Step SC12.

At Step SC12, it is checked whether downloading of the music data MD is completed or not. If not, the flow returns to Step SC9 as indicated by a NO arrow to continue displaying the advertisement corresponding to the advertisement display data AD. If downloading of the music data MD is not completed, the flow advances to Step SC5 as indicated by a YES arrow. Next, the description will be given for the case that it is judged at Step SC7 there is no advertisement music data.

At Step SC13, in accordance with the advertisement display data AD downloaded at Step SC6 and stored in RAM 14c, an advertisement is displayed on the display 132. This operation is similar to that at Step SC9. After the advertisement is displayed, the flow advances to the next Step SC14.

At Step SC14, downloading the music data MD starts. This operation is similar to that at Step SC3. Thereafter, the flow advances to the next Step SC15.

At Step SC15, it is checked whether downloading of the music data MD is completed or not. If not, the flow returns to Step SC13 as indicated by a NO arrow to continue displaying the advertisement corresponding to the advertisement display data AD. If the music data MD is downloaded completely, the flow advances to Step SC5 as indicated by a YES arrow to thereafter terminate the downloading process.

Figure 10:
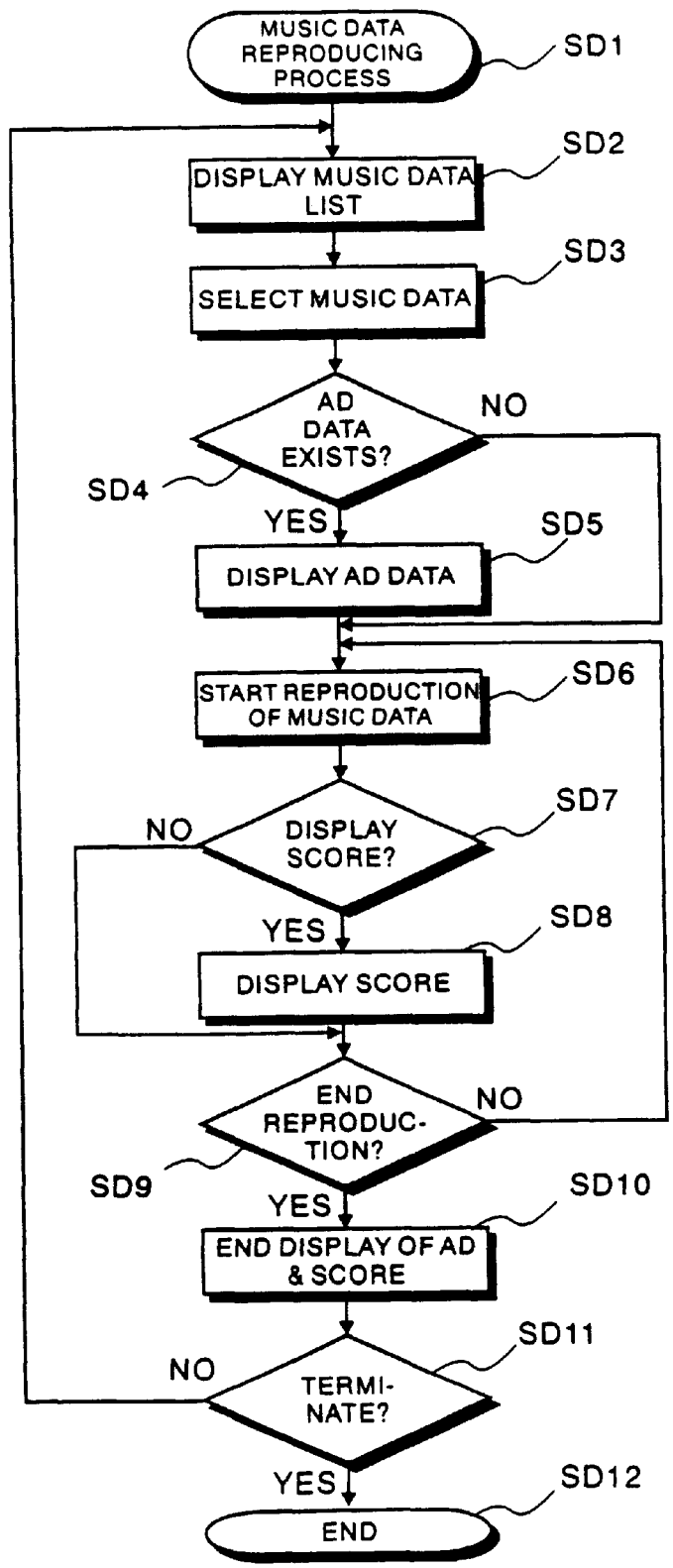
FIG. 10 is a flow chart illustrating a music data reproducing process.

FIG. 10 is a flow chart illustrating the music data reproducing process to be executed by CPU 16 of the electronic musical apparatus 2 shown in FIG. 3 (or mobile phone 3 shown in FIG. 5) constituting the music data receiving apparatus 2a–2d or 3b shown in FIG. 1. In the following, although the description is mainly directed to the case that the electronic musical apparatus 2 is used as the music data receiving apparatus, the fundamental process does not differ even for the case that the mobile phone 3 is used as the music data receiving apparatus 3b.

At Step SD1, the music data reproducing process starts to advance to the next Step SD2.

At Step SD2, the list of the music data MD is displayed on the display 132, the list being stored in the external storage unit 17c (FIG. 6) of the electronic musical apparatus 2.

At Step SD3, the user is urged to select the music data MD to be automatically reproduced, from the list of the music data displayed on the display 132. After the user selects the music data, the flow advances to the next Step SD4.

At Step SD4, it is checked whether the advertisement data (advertisement display data AD and advertisement music data AM) is appended to the music data selected by the user. If appended, the flow advances to the next Step SD5 as indicated by a YES arrow, whereas if not appended, the flow advances to Step SD6 as indicated by a NO arrow.

At Step SD5, the advertisement display data AD stored in the external storage unit 17c (FIG. 6) of the electronic musical apparatus 2 is read to the advertisement data storage area R11 of RAM 14c, and an advertisement corresponding to the advertisement display data AD is displayed on the display 132. A display of the advertisement display data AD on the display 132, may be that shown in FIG. 12A. If the mobile phone 3 is used as the music data receiving apparatus 3b, as shown in FIG. 12B an advertisement by the advertisement display data AD is displayed on the display 133. An advertisement display is fundamentally continues until an advertisement display end command is issued. After the advertisement is displayed, the flow advances to the next Step SD6.

If the advertisement music data AM is also appended, the advertisement music data AM is read to the advertisement data storage area R11 of RAM 14c, and sequentially sent from RAM 14C to the musical tone generator circuit 19 (FIG. 3) to reproduce sounds. After this operation, the flow advances to Step SD6.

At Step SD6, the music data MD selected by the user is reproduced. The music data MD is read from the external storage unit 17c (FIG. 6) of the electronic musical apparatus 2 to the music data storage area R10 of RAM 14c. Next, MIDI event data constituting the music data MD is time sequentially read from RAM 14c. The MIDI event data read from RAM 14c is sequentially supplied to the musical tone generator circuit 19 (FIG. 3) to reproduce sounds. Thereafter, the flow advances to Step SD7.

The format of the music data MD may be any type, such as an "event+ relative time" type that the occurrence time of each performance event is represented by a time from one preceding event, an "event+ absolute time" type that the occurrence time of each performance event is represented by an absolute time in music or in a measure, a "pitch (rest)+ note length" type that performance data is represented by a note pitch and note length or by a rest and rest length, and a "direct type" that a memory area is reserved for each performance data of a minimum resolution and the performance data is stored in the memory area corresponding to the occurrence time of the performance data.

A method of processing the music data MD at the musical tone generator circuit 19 (FIG. 3) may be any method such as a method in which a process period is changed with a set tempo, a method in which the value of timing data in the music data MD is changed with a set tempo and a constant process period is maintained, and a method in which a count method for timing data in the music data is changed with a tempo and a constant process period is maintained.

At Step SD7, the user is urged to determine whether a score is displayed. If a score is to be displayed, the flow advances to the next Step SD8 as indicated by a YES arrow. If a score is not displayed, the flow advances to Step SD9 as indicated by a NO arrow.

Figure 12C:

At Step SD8, the music data MD of the designated number of measures (e.g., two measures or four measures) is read in advance from RAM 14c, and a score corresponding to the music data MD read in advance is displayed on the display 132 of the electronic musical apparatus 2 such as shown in FIG. 12C. During this score display, a currently reproducing part may be displayed emphasized. If a display of a high resolution is used, a score having more measures can be displayed or scores of a plurality of channels can be displayed at the same time. In the example shown in FIG. 12C, although the advertisement is displayed at the same time, it is not necessarily required to display it at the same time. After the score is displayed, the flow advances to the next Sep SD9.

At Step SD9, it is checked whether reproduction of the music data MD is completed or not. If completed, the flow advances to the next Step SD10 as indicated by a YES arrow, whereas if not completed, the flow returns to Step SD6 as indicated by a NO arrow.

At Step SD10, the advertisement and score display is terminated to advance to the next Step SD11.

At Step SD11, the user is urged to determine whether the music data reproducing process to be terminated or not. If to be terminated, the flow advances to the next Step SD12 as indicated by a YES arrow, whereas if the music data reproducing process is to be continued, the flow returns to Step SD2 as indicated by a NO arrow.

At Step SD12, the music data reproducing process is terminated.

Figure 11:
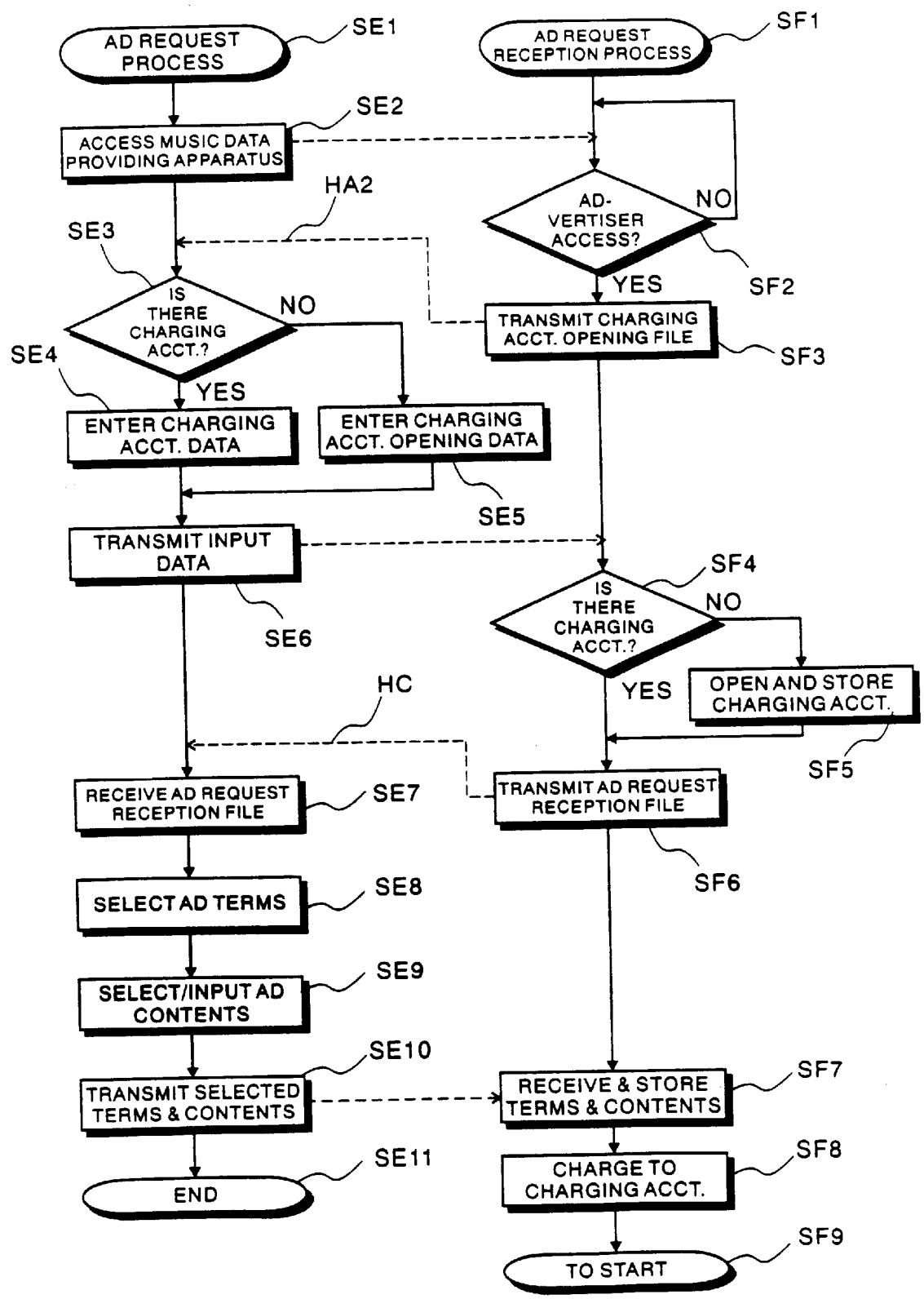
FIG. 11 is a flow chart illustrating advertisement request reception process.

FIG. 11 is a flow chart illustrating the advertisement request process to be executed by CPU 16 of the advertiser PC 1b (computer 1) shown in FIG. 1, and the corresponding advertisement request reception process to be executed by CPU 16 of the music data providing apparatus 1a (computer 1) shown in FIG. 1.

First, the advertisement request process to be executed by CPU 16 of the advertiser PC 1b (computer 1) will be described.

At Step SE1, the advertisement request process starts to advance to the next Step SE2.

At Step SE2, the advertiser inputs the URL of the music data providing apparatus 1a to access the apparatus 1a via the Internet (communication network) 5. Thereafter, the flow advances to Step SE3.

At Step SE3, the advertiser receives the advertiser charging account opening file HA2 from the music data providing apparatus 1a, and the advertiser is asked whether the advertiser has already the advertiser charging account. If the advertiser has already the advertiser charging account, the flow advances to the next Step SE4 as indicated by a YES arrow, whereas if not, the flow advances to Step SE5 as indicated by a NO arrow.

At Step SE4, the advertiser is urged to enter the charging account information. The charging account information is information such as a user name and a password for confirming the identity of the advertiser. The charging account information may be stored in the external storage unit 17b of the advertiser PC 1b. In this case, it is not necessary for the advertiser to enter the charging account information. After the charging account information is entered, the flow advances to the next Step SE6.

At Step SE5, the advertiser is urged to enter charging account opening data. The charging account opening data is required in order to open a new advertiser charging account, and includes at least information such as a user name and a password for confirming the identity of the advertiser and a charging method. Thereafter, the flow advances to the next Step SA6.

At Step SA6, the data entered by the advertiser at Step SE4 or SE5 is transmitted to the music data providing apparatus 1a. Thereafter, the flow advances to the next Step SE7.

At Step SE7, the advertiser receives the advertisement request reception file HC from the music data providing apparatus 1a. Thereafter, the flow advances to the next Step SE8.

At Step SE8, the advertiser is urged to select the advertisement terms of an advertisement to be appended to music data MD in accordance with the advertisement request reception file HC received at Step SE7. The advertiser choices whether the advertisement to be appended is only an advertisement display or both the advertisement display and advertisement sounds. Thereafter, the flow advances to Step SE9.

At Step SE8, the advertiser may be urged to select music data to be appended to the advertisement, or to select not the specific music data but only a specific musical genre or the like. If the music data or musical genre to be appended to the advertisement is allowed to be designated by the advertiser, the advertisement can be put to those users who prefer the designated music data or musical genre. Namely, the users to whom the advertisement is put can be narrowed down to some extent.

At Step SE9, the advertiser is urged to enter or select the contents of the advertisement to be appended to the music data MD. Specifically, the advertiser inputs only the advertisement display data AD such as text data or both the advertisement display data AD and advertisement music data AM such as sound data and music data, or selects such data from the external storage unit 17b of the advertiser PC 1b.

The advertisement contents to be input or selected may be stored beforehand in the external storage unit 17b of the music data providing apparatus 1a to allow the advertiser to select the desired contents therefrom. After the advertisement contents are input or selected, the flow advances to the next Step SE10.

At Step SE10, information on the advertisement terms and contents such as the advertisement display data AD and advertisement music data AM to be appended to the music data MD selected or input at Steps SE8 and SE9 is transmitted to the music data providing apparatus 1a. Thereafter, the flow advances to the next Step SE11.

At Step SE11, the advertisement request process is terminated.

Next, the advertisement request reception process to be executed by CPU 16 of the music data providing apparatus 1a (computer 1) will be described.

At Step SF1, the advertisement request reception process starts to advance to the next Step SF2.

At Step SF2, it is checked whether there is an access from the advertiser (advertiser PC 1b). If there is an access from the advertiser PC 1b, the flow advances to the next Step SF3 as indicated by a YES arrow. If there is no access from the advertiser PC 1b, this Step SF2 continues as indicated by a NO arrow until an access is made from the advertiser PC 1b.

At Step SF3, the charging account opening file HA2 is transmitted to the advertiser PC 1b. Thereafter, the flow advances to Step SF4.

At Step SF4, the charging account information or charging account opening data is received from the advertiser PC 1b. If the charging account information is received, it can be known that the accessing advertiser has already the charging account. In this case, therefore, the user name, password and the like are verified by using the advertiser charging account database DB2 to thereafter advance to Step SF6 as indicated by a YES arrow.

If the charging account opening data is received, it can be known that the accessing advertiser user wishes to open a new charging account. Therefore, the flow advances to the next Step SF5 as indicated by a NO arrow.

At Step SF5, in accordance with the charging account opening data received at Step SF4, an advertiser charging account is opened and stored in the advertiser charging account database DB2. Thereafter, the flow advances to the next Step SF6.

At Step SF6, the advertisement request reception file HC is transmitted to the advertisement PC 1b. Thereafter, the flow advances to the next Step SF7.

At Step SF7, the information on the advertisement terms and contents transmitted from the advertiser PC 1b is received and stored. The received information is the advertisement terms, advertisement display data AD, advertisement music data AM and the like to be appended to the music data MD and transmitted from the advertiser PC 1b at Step SE10 of the advertisement request process.

The received advertisement display data AD and advertisement music data AM are stored in the advertisement data area R4 shown in FIG. 6. The identifiers such as file names and storage locations of the advertisement display data AD and advertisement music data AM are stored in the advertisement charging account database DB2. Thereafter, the flow advances to Step SF8.

At Step SF8, a predetermined advertisement fee is incurred to the advertisement charging account stored in the advertiser charging account database BD2. Thereafter, the flow advances to the next Step SF9.

At Step SF9, the flow returns to Step SF1 to resume the advertisement request reception process.

As described so far, according to the embodiment of the invention, by appending advertisement data to music data, an advertisement fee can be received from the advertiser so that the distribution price for the music data can be reduced.

Further, according to the embodiment of the invention, advertisement display and advertisement sound reproduction corresponding to advertisement data are performed when music data or the like is downloaded so that advertisement can efficiently made to users of electronic musical apparatus.

Still further, if only the advertisement display data is appended to music data, sounds of the music data can be listened without being disturbed by the advertisement.

Furthermore, even if the advertisement music data is appended, sounds of the music data can be listened without being disturbed by the advertisement if it is set in such a manner that sounds of the advertisement music data are reproduced only during downloading the music data and only the advertisement corresponding to the advertisement display data is displayed during the later automatic musical performance.

In this embodiment, although the music data such as MIDI data and the advertisement data are separately stored and downloaded, they may be combined. For example, the advertisement display data and advertisement sound data may be embedded in the music data such as MIDI data.

Also in this embodiment, although an electronic musical instrument with a keyboard, a mobile phone with a musical tone generator, and the like are used as the electronic musical apparatus, other apparatus may also be used if they can download music data and advertisement data and have an automatic performance function and a display for displaying an advertisement. For example, a karaoke system, a game device, and an automatic performance piano may also be applicable. The type of an electronic musical instrument is not limited only to a keyboard type instrument, but other types may also be used such as a stringed instrument, a wind instrument and a percussion instrument. The electronic musical apparatus is not limited only to an electronic musical instrument of the type that the components thereof such as a musical tone generator and an automatic performance apparatus are all built in one integrated body, but these components may be separate and interconnected by communication devices such as MIDI and various networks.

The embodiment may be realized by a personal computer installed with a computer program and the like realizing the functions of the embodiment.

In such a case, the computer program and the like realizing the embodiment functions may be stored in a computer readable storage medium such as a CD-ROM and a floppy disk and supplied to users.

If the personal computer is connected to a communication network such as a LAN, the Internet and a telephone line, the computer program and various data may be supplied to the personal computer via the communication network.

The running information of each electronic musical apparatus may be transmitted to the music data providing apparatus 1a to charge each time an automatic musical performance is made by using music data or to utilize the information for statistical investigation such as data acquisition of popular music.

This system may be used as an on-line education system for the performances of musical instruments. In this case, information on subject music and performance operation at the electronic musical apparatus 2 is transmitted to the music data providing apparatus 1a to store data of performance skill, training frequency and the like of the user in the external storage unit 17a of the music data providing apparatus 1a. The stored data is automatically analyzed to present the user with the next subject music and performance target.

The present invention has been described in connection with the preferred embodiments. The invention is not limited only to the above embodiments. It is apparent that various modifications, improvements, combinations, and the like can be made by those skilled in the art.

I claim:

1. A music data providing apparatus comprising:
   a memory that stores a plurality of music data and a plurality of advertisement data;
   a receiver that receives a request for a desired music data from a user via a network;
   an advertisement appending device that appends at least one advertisement data among the plurality of advertisement data stored in said memory to the music data corresponding to the received request;
   a transmitter that transmits the music data appended with the advertisement data to the user via the network, wherein the appended advertisement data is transmitted before the music data is transmitted; and a user charging device that charges a reduced music data price corresponding to the appended advertisement data to the user when said transmitter transmits the music data in accordance with the request.

2. The music data providing apparatus according to claim 1, wherein the advertisement data comprises an advertisement display data and an advertisement music data.

3. The music data providing apparatus according to claim 1, wherein said transmitter is capable of wireless communication.

4. The music data providing apparatus according to claim 1, wherein said advertisement appending device inquires whether the user wishes to append the advertisement data or not, and appends the advertisement data if the user wishes to append the advertisement data, and said user charging device reduces the music data price at an amount corresponding to the advertisement data that the user wishes to be appended.

5. A music data receiving apparatus comprising:

a transmitter that transmits a request for a desired music data and user charging information to charge a reduced music data price corresponding to an appended advertisement data to a server connected to a network;

a receiver that receives the advertisement data and the requested music data transmitted from the server via the network;

a display that displays advertisement corresponding to the received advertisement data, wherein the advertisement data is received before the music data is received; and a musical tone generator that generates musical tone in accordance with the received music data.

6. A music data providing system comprising:

a music data providing apparatus comprising:

a memory that stores a plurality of music data and a plurality of advertisement data;

a receiver that receives a request for a desired music data from a user from a network;

an advertisement appending device that appends at least one advertisement data among the plurality of advertisement data stored in said memory to the music data corresponding to the received request;

a transmitter that transmits the music data appended with the advertisement data to the network, wherein the appended advertisement data is transmitted before the music data is transmitted;

a user charging device that charges a reduced music data price corresponding to the appended advertisement data to the user when said transmitter transmits the music data in accordance with the request; and a music data receiving apparatus comprising: a transmitter that transmits a request for a desired music data and user charging information to charge a reduced music data price corresponding to an appended advertisement data to a server connected to a network; a receiver that receives the advertisement data and the requested music data transmitted from the server via the network, wherein the advertisement data is received before the music data is received; a display that displays advertisement corresponding to the received advertisement data; and a musical tone generator that generates musical tone in accordance with the received music data.

7. The music data providing system according to claim 6, wherein:

said receiver of said music data providing apparatus further receives advertisement data transmitted from an advertiser;

the advertisement data stored in said memory of said music data providing apparatus is the advertisement data transmitted from the advertiser; and said music data providing apparatus further comprises advertiser charging device that charges an advertisement fee to the advertiser when said advertisement appending device appends the advertisement data transmitted from the advertiser to the music data.

8. The music data providing system according to claim 7, wherein:

said music data providing apparatus further comprises user charging device that charges a music data price to the user when said transmitter transmits the music data corresponding to the request;

said advertisement appending device inquires whether the user wishes to append the advertisement data or not, and appends the advertisement data if the user wishes to append the advertisement data; and said user charging device charges a reduced price when said advertisement appending device appends the advertisement data.

9. A music data providing method for a network server having a memory that stores a plurality of music data and a plurality of advertisement data, the method comprising the steps of:

(a) receiving a request for a desired music data from a user via a network;

(b) appending at least one advertisement data among the plurality of advertisement data stored in said memory to the music data corresponding to the received request;

(c) transmitting the music data appended with the advertisement data to the user via the network, wherein the appended advertisement data is transmitted before the music data is transmitted; and (d) charging a reduced music data price corresponding to the appended advertisement data to the user when said transmitting step (c) transmits the music data in accordance with the request.

10. The music data providing method according to claim 9, wherein said receiving step (a) further receives advertisement data transmitted from an advertiser, and the advertisement data stored in said memory is the advertisement data transmitted from the advertiser at the step (a), further comprising the step of (d) charging an advertisement fee to the advertiser when said advertisement appending step (b) appends the advertisement data transmitted from the advertiser.

11. A music data receiving method comprising the steps of:

(a) transmitting a request for a desired music data and user charging information to charge a reduced music data price corresponding to an appended advertisement data to a server connected to a network;

(b) receiving the advertisement data and the requested music data transmitted from the server via the network, wherein the advertisement data is received before the music data is received;

(c) displaying advertisement corresponding to the received advertisement data; and (d) generating musical tone in accordance with the received music data.

12. A program, which a computer executes to realize a music data providing process for a network server having a memory that stores a plurality of music data and a plurality of advertisement data, the music data providing process comprising: the instructions of:

(a) receiving a request for a desired music data from a user via a network;

(b) appending at least one advertisement data among the plurality of advertisement data stored in said memory to the music data corresponding to the received request;

(c) transmitting the music data appended with the advertisement data to the user via the network, wherein the appended advertisement data is transmitted before the music data is transmitted; and (d) charging a reduced music data price corresponding to the appended advertisement data to the user when said transmitting instruction (c) transmits the music data in accordance with the request.

13. The program according to claim 12, wherein said receiving instruction (a) further receives advertisement data transmitted from an advertiser and the advertisement data stored in the memory is the advertisement data transmitted from the advertiser, further comprising the instruction of (d) charging an advertisement fee to the advertiser when said advertisement appending instruction (b) appends the advertisement data transmitted from the advertiser.

14. The program according to claim 13, further comprising the instruction of (e) charging a music data price to the user when said transmitting instruction (c) transmits the music data corresponding to the request, and wherein said advertisement appending instruction inquires whether the user wishes to append the advertisement data or not, and appends the advertisement data if the user wishes to append the advertisement data, and said user charging instruction (e) charges a reduced price when said advertisement appending device appends the advertisement data.

15. A program, which a computer executes to realize a music data receiving process, comprising the instructions of:

(a) transmitting a request for a desired music data to a server connected to a network and user charging information to charge a reduced music data price corresponding to an appended advertisement data;

(b) receiving the advertisement data and the requested music data transmitted from the server via the network, wherein the advertisement data is received before the music data is received;

(c) displaying advertisement corresponding to the received advertisement data; and (d) generating musical tone in accordance with the received music data.

16. A music data providing apparatus comprising:

a memory that stores a plurality of music data and a plurality of advertisement data transmitted from the advertiser;

a receiver that receives a request for a desired music data from a user and advertisement data transmitted from an advertiser via a network;

an advertisement appending device that appends at least one advertisement data among the plurality of advertisement data stored in said memory to the music data corresponding to the received request;

a transmitter that transmits the music data appended with the advertisement data to the user via the network, wherein the appended advertisement data is transmitted before the music data is transmitted; and an advertiser charging device that charges an advertisement fee to the advertiser when said advertisement appending device appends the transmitted advertisement data to the music data.

17. The music data providing apparatus according to claim 16, further comprising a user charging device that charges a music data price to the user when said transmitter transmits the music data in accordance with the request, wherein said advertisement appending device inquires whether the user wishes to append the advertisement data or not, and appends the advertisement data if the user wishes to append the advertisement data, and wherein said user charging device charges a reduced price when said advertisement appending device appends the advertisement data.

18. A music data providing apparatus comprising:

a memory that stores a plurality of music data and a plurality of advertisement data comprising an advertisement display data for displaying an advertisement;

a receiver that receives a request for a desired music data from a user via a network;

an advertisement appending device that appends at least one advertisement data among the plurality of advertisement data stored in said memory to the music data corresponding to the received request; and a transmitter that transmits the music data appended with the advertisement data to the user via the network, wherein the appended advertisement data is transmitted before the music data is transmitted.

19. A music data receiving apparatus comprising:

a transmitter that transmits a request for a desired music data to a server connected to a network;

a receiver that receives an advertisement display data for displaying an advertisement and the requested music data transmitted from the server via the network;

a display that displays advertisement corresponding to the received advertisement display data;

an advertisement controlling device that controls said receiver to receive the advertisement data comprising the advertisement display data before receiving the music data and controls said display to display the advertisement display data while receiving the music data by said receiver; and a musical tone generator that generates musical tone in accordance with the received music data.

20. The music data receiving apparatus according to claim 19, wherein said display displays the advertisement display data while said musical tone generator generates musical tone in accordance with the music data.

21. The music data receiving apparatus according to claim 19, wherein:

the advertisement data further comprises an advertisement music data; and said musical tone generator generates musical tone in accordance with the advertisement music data while said receiver is receiving the music data.

* * * * *